United States Patent
O'Rourke et al.

(10) Patent No.: US 7,109,264 B2
(45) Date of Patent: *Sep. 19, 2006

(54) LOW POLARITY DIMERATE AND TRIMERATE ESTERS AS PLASTICIZERS FOR ELASTOMERS

(75) Inventors: Stephen E. O'Rourke, Bolingbrook, IL (US); Kimberly L. Stefanisin, Oak Lawn, IL (US); Gary Wentworth, Chicago, IL (US); Urvil B. Shah, Mokena, IL (US)

(73) Assignee: CPH Innovations Corp., Chicago, IL (US)

(*) Notice: Subject to any disclaimer, the term of this patent is extended or adjusted under 35 U.S.C. 154(b) by 313 days.

This patent is subject to a terminal disclaimer.

(21) Appl. No.: 10/616,658

(22) Filed: Jul. 10, 2003

(65) Prior Publication Data

US 2004/0072934 A1 Apr. 15, 2004

Related U.S. Application Data

(60) Provisional application No. 60/396,453, filed on Jul. 17, 2002.

(51) Int. Cl.
- *A61L 15/62* (2006.01)
- *C08K 5/09* (2006.01)
- *C08K 5/10* (2006.01)
- *C08K 5/101* (2006.01)

(52) U.S. Cl. ........................ 524/305; 524/315

(58) Field of Classification Search .............. 524/306, 524/315
See application file for complete search history.

(56) References Cited

U.S. PATENT DOCUMENTS

| | | | |
|---|---|---|---|
| 2,940,949 A | 6/1960 | Mullin et al. | 260/31.4 |
| 3,654,007 A | 4/1972 | Winstanley et al. | 156/132 |
| 3,825,515 A | 7/1974 | Lucas et al. | 260/31.8 M |
| 3,951,887 A | 4/1976 | Tanimura et al. | 260/3 |
| 3,968,198 A | 7/1976 | Honda et al. | 264/343 |
| 3,993,847 A | 11/1976 | Kondo | 428/451 |
| 4,038,220 A | 7/1977 | Thompson | 260/3 |
| 4,054,561 A | 10/1977 | Strauss et al. | 260/22 D |
| 4,061,835 A | 12/1977 | Poppe et al. | 428/522 |
| 4,078,114 A | 3/1978 | Aronoff et al. | 428/379 |
| 4,260,541 A | 4/1981 | Kolinsky et al. | 260/45.8 |
| 4,281,077 A | 7/1981 | Hirzy | 525/129 |
| 4,376,711 A | 3/1983 | Shaub | 252/32.7 E |
| 4,472,537 A | 9/1984 | Johnson et al. | 523/160 |
| 4,550,147 A | 10/1985 | Oohara | 525/332.6 |
| 4,588,761 A | 5/1986 | Thoma et al. | 524/38 |
| 4,645,788 A | 2/1987 | Okumoto et al. | 524/308 |
| 4,656,214 A | 4/1987 | Wickson | 524/287 |
| 4,683,250 A | 7/1987 | Mikami | 522/33 |
| 4,789,381 A | 12/1988 | Oshiyama et al. | 8/115.6 |
| 4,978,392 A | 12/1990 | Kilbarger et al. | 106/95 |
| 4,978,716 A | 12/1990 | Flynn et al. | 525/195 |
| 5,021,490 A | 6/1991 | Vyvoda et al. | 524/140 |
| 5,057,566 A | 10/1991 | Kobayashi et al. | 524/297 |
| 5,071,899 A | 12/1991 | Wozniak | 524/314 |
| 5,169,716 A | 12/1992 | Croft et al. | 428/379 |
| 5,290,886 A | 3/1994 | Ellul | 524/515 |
| 5,298,539 A | 3/1994 | Singh et al. | 524/92 |
| 5,380,786 A | 1/1995 | Greenlee et al. | 524/560 |
| 5,428,089 A | 6/1995 | Ishikawa et al. | 524/188 |
| 5,604,277 A | 2/1997 | Osborn | 524/270 |
| 5,605,955 A | 2/1997 | Hirai | 524/588 |
| 5,792,805 A | 8/1998 | Williams | 524/100 |
| 5,922,808 A | 7/1999 | Hanada et al. | 525/58 |
| 5,973,045 A | 10/1999 | Dowling et al. | 524/270 |
| 5,985,963 A | 11/1999 | D'Sidocky et al. | 524/105 |
| 6,111,004 A | 8/2000 | Biesiada et al. | 524/311 |
| 6,127,512 A | 10/2000 | Asrar et al. | 528/272 |
| 6,262,180 B1 | 7/2001 | Klun et al. | 525/199 |
| 6,326,426 B1 | 12/2001 | Ellul | 524/270 |
| 6,369,264 B1 | 4/2002 | Day et al. | 560/83 |
| 6,858,664 B1 * | 2/2005 | Wentworth et al. | 514/449 |
| 6,884,832 B1 * | 4/2005 | Wentworth et al. | 524/306 |
| 2002/0010275 A1 | 1/2002 | Maly et al. | 525/177 |
| 2003/0171471 A1 | 9/2003 | Pritschins et al. | 524/306 |
| 2003/0220426 A1 | 11/2003 | Wentworth et al. | 524/284 |
| 2003/0220427 A1 | 11/2003 | Wentworth et al. | 524/284 |
| 2004/0002563 A1 | 1/2004 | Wentworth et al. | 524/306 |
| 2004/0002564 A1 * | 1/2004 | Wentworth et al. | 524/306 |
| 2004/0122145 A1 * | 6/2004 | Klosowski et al. | 524/284 |
| 2004/0127616 A1 * | 7/2004 | Wentworth et al. | 524/284 |

FOREIGN PATENT DOCUMENTS

| | | |
|---|---|---|
| CA | 2408772 | 4/2003 |
| EP | 0 073 174 A1 | 3/1982 |
| EP | 0 450 105 A1 | 10/1991 |
| EP | 0 704 491 | 4/1996 |
| EP | 1 022 306 A1 | 7/2000 |
| EP | 1 304 210 | 4/2003 |
| FR | 2 417 522 | 9/1979 |
| GB | 1 045 577 | 10/1966 |
| JP | 06223316 | 4/1996 |
| WO | WO 2004/009692 | 1/2004 |

OTHER PUBLICATIONS

U.S. Appl. No. 10/360,294, filed Feb. 2003, O'Rourke et al.*
International (PCT) Search Report for PCT/US03/21866 dated Nov. 7, 2003.
International Preliminary Examination Report for PCT/US03/21866 dated May 14, 2004.

* cited by examiner

*Primary Examiner*—Nathan M. Nutter
(74) *Attorney, Agent, or Firm*—Marshall, Gerstein & Borun LLP

(57) ABSTRACT

An elastomeric composition including a natural or synthetic rubber, and a cyclic dimerate ester and/or a cyclic trimerate ester plasticizer.

26 Claims, No Drawings

LOW POLARITY DIMERATE AND TRIMERATE ESTERS AS PLASTICIZERS FOR ELASTOMERS

CROSS REFERENCE TO RELATED APPLICATION

This claims the benefit under 35 U.S.C. §119(e) of U.S. Provisional Patent Application Ser. No. 60/396,453, filed Jul. 17, 2002, the entire disclosure of which is incorporated herein by reference.

FIELD OF THE INVENTION

The present invention is directed to low polarity dimerate and/or trimerate esters for plasticizing elastomers, including natural and/or synthetic rubbers.

BACKGROUND

A number of elastomers are very difficult to plasticize. For example, elastomers, such as EPDM, are difficult to plasticize since it is difficult to find plasticizers that are sufficiently compatible to avoid the plasticizer exuding (bleeding) to the surface of the elastomer upon cooling and solidification of the elastomer. Usually, hydrocarbon oils such as naphthenic oils or paraffinic oils are used to plasticize elastomers such as EPDM. While hydrocarbon-based processing oils can be used with partial success, the resulting plasticized compositions lack advantageous low temperature properties and the processing oils have a tendency to exude (bleed) to the surface of the elastomeric article. Attempts to use conventional linear dibasic acid esters, such as dioctyl adipate, dioctyl sebacate, and di-2-ethylhexyl sebacate, or phthalate esters, such as di-2-ethylhexyl phthalate, have also been unsuccessful since such conventional ester plasticizers are either incompatible with the elastomer, resulting in exudation of the plasticizer, or are too volatile for many elastomer uses.

U.S. Pat. No. 5,290,886 teaches using organic ester plasticizers to plasticize thermoplastic elastomers comprising a blend of a thermoplastic polyolefin and an elastomer to lower the glass transition temperature ($T_g$) of both the elastomer and the polyolefin phases and to improve impact strength at low temperatures. The '886 patent neither discloses nor suggests using the cyclic dimerate and/or cyclic trimerate esters disclosed herein, and found that "polymeric dibasic esters and aromatic esters were found to be significantly less effective" (column 3, lines 62–64).

Dimer acid esters have been proposed as plasticizers for high temperature resistant fluorocarbon polymers (see U.S. Pat. No. 4,078,114) and for plasticizing anhydride-functionalized polymers (see U.S. Pat. No. 5,169,716) but have not been suggested for plasticizing non-fluorocarbon polymers, non-anhydride-functionalized polymers, or elastomers. It is preferred that the elastomers plasticized with the dimerate and/or trimerate esters disclosed herein are not fluorocarbon polymers, fluorocarbon elastomers, anhydride-functionalized polymers, or anhydride-functionalized elastomers.

Surprisingly and unexpectedly, dimerate and/or trimerate esters designed to have very low polarity act as efficient plasticizers for elastomers. The resulting plasticized compositions have excellent low temperature properties and exhibit little or no tendency of the plasticizer to exude or bleed to the surface of the elastomer composition. Use of the dimerate and/or trimerate esters as disclosed herein provides an advantageous balance of flexibility, impact resistance, and strength to the plasticized elastomers.

SUMMARY OF THE INVENTION

In brief, it has been found that the use of cyclic dimerate and/or trimerate esters, formed from mono-, di-, and/or tri-carboxylic acids containing one, two, or three $C_3$–$C_{24}$ radicals or fatty acid residues and $C_3$–$C_{24}$ alkyl alcohols, in a natural or synthetic vulcanizable rubber, unexpectedly increases the low temperature properties of the rubber for uses such as, hoses, belts, conveyor belts, motor mounts, gaskets, automotive drive train belts, including transmission belts, roofing compounds, and the like. By adding one or more cyclic dimerate and/or trimerate esters (di- and/or tri-esters), particularly dimerate esters derived from $C_{18}$ fatty acids and $C_3$–$C_{24}$ alcohols, preferably, $C_3$–$C_{18}$ alcohols, more preferably, $C_6$–$C_{18}$ alcohols, the low temperature properties of the elastomer are surprisingly improved. Preferably, the esters are formed by reacting a $C_3$–$C_{18}$ alcohol with a mixture of mono-, di-, and tri-fatty acids, e.g., primarily $C_{18}$ carboxylic acids, and their dimers and trimers.

DETAILED DESCRIPTION OF THE PREFERRED EMBODIMENTS

The cyclic dimerate and/or trimerate ester plasticizers described herein are added to one or more natural or synthetic rubbers, preferably together with a vulcanizing agent. Surprisingly, the cyclic ester plasticizers disclosed herein significantly increase the low temperature properties of the rubber composition and provide an excellent and unexpected balance of flexibility, impact resistance, and strength to the elastomer composition.

The cyclic esters may be diesters, triesters, or mixtures thereof, including saturated or unsaturated hydrocarbon chains, straight chain or branched, having zero to six double bonds in the hydrocarbon chains. While cyclic monoesters are less preferred, they also may successfully be used in accordance with the present disclosure.

Many of the cyclic diester and/or cyclic triester materials are formed from self reaction of naturally derived fatty acid mixtures containing oleic, linoleic, and linolenic acids, and consequently are blends of mono-, di-, and tri-carboxylic acid esters. The blends may further include other compounds that do not adversely affect the advantages imparted to elastomers by the subject cyclic dimerate and/or trimerate esters described herein.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The cyclic diesters, referred to herein as dimerates, have a formula I, as follows:

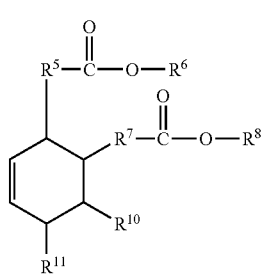

(I)

wherein $R^5$ and $R^7$, same or different, are $C_3$–$C_{24}$, preferably $C_6$–$C_{24}$, more preferably $C_8$–$C_{18}$ hydrocarbon chains, straight chain or branched, either saturated or containing 1 to 6, preferably 1 to 3, carbon-to-carbon double bonds;

$R^6$ and $R^8$, same or different, are $C_3$–$C_{24}$, preferably $C_3$–$C_{18}$, more preferably $C_6$–$C_{18}$ alkyl, straight chain or branched, saturated or unsaturated containing 1 to 3 carbon-to-carbon double bonds; and $R^{10}$ and $R^{11}$, same or different, are $C_3$–$C_{24}$, preferably $C_3$–$C_{18}$, more preferably $C_6$–$C_{18}$ saturated hydrocarbon chain, straight chain or branched; or an unsaturated $C_3$–$C_{24}$, preferably $C_3$–$C_{18}$, more preferably $C_6$–$C_{18}$ hydrocarbon chain, straight chain or branched, containing 1 to 6, preferably 1 to 3, carbon-to-carbon double bonds.

The cyclic triesters, referred to herein as trimerates, have a formula II, as follows:

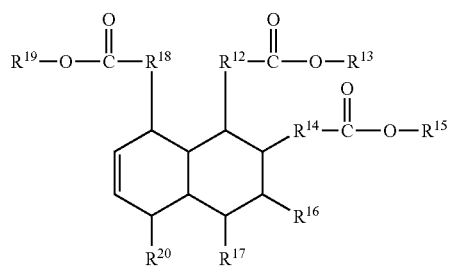

(II)

wherein $R^{12}$, $R^{14}$ and $R^{18}$, same or different, are $C_3$–$C_{24}$, preferably $C_6$–$C_{24}$, more preferably $C_8$–$C_{18}$ hydrocarbon chain, straight chain or branched, either saturated or containing 1 to 6, preferably 1 to 3, carbon-to-carbon double bonds;

$R^{13}$, $R^{15}$ and $R^{19}$, same or different, are $C_3$–$C_{24}$ alkyl, preferably $C_3$–$C_{18}$ chains, more preferably $C_6$–$C_{18}$ alkyl, straight chain or branched, saturated or unsaturated containing 1 to 3 carbon-to-carbon double bonds; and $R^{16}$, $R^{17}$ and $R^{20}$, same or different, are $C_3$–$C_{24}$, preferably $C_3$–$C_{18}$, more preferably $C_6$–$C_{18}$ saturated hydrocarbon chains, straight chain or branched; or unsaturated $C_3$–$C_{24}$, preferably $C_3$–$C_{18}$, more preferably $C_6$–$C_{18}$ hydrocarbon chains, straight chain or branched, containing 1 to 6, preferably 1 to 3, carbon-to-carbon double bonds.

The low polarity of the cyclic ester compounds disclosed herein is important for successfully plasticizing elastomeric compositions. Low polarity cyclic ester compounds, e.g., ester compounds formed from dimer acids and alcohols having a single hydroxyl group are preferred. Similarly, it is preferred that $R^6$, $R^8$, $R^{13}$, $R^{15}$, and $R^{19}$ of formulas I and II do not contain hydroxyl substituents. Dimerate esters formed from dimer acids and glycol type alcohols, for example, glycol alcohols such as ethylene glycol, diethylene glycol, triethylene glycol, and other polyethylene glycols, would be too polar to plasticize elastomeric compositions while simultaneously providing superior low temperature properties. Additionally, esters prepared by reacting dimer acids with the glycol functionalized monomers and oligomers set forth in U.S. Pat. No. 4,054,561 would also be too polar for use as plasticizers.

Useful cyclic diesters falling within formula I include dimerate ester structures formed by the reaction of $C_{36}$ dimer acid derived from tall oil fatty acids and $C_3$–$C_{24}$, preferably $C_3$–$C_{18}$, more preferably $C_6$–$C_{18}$ alcohols, straight chain or branched, saturated or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

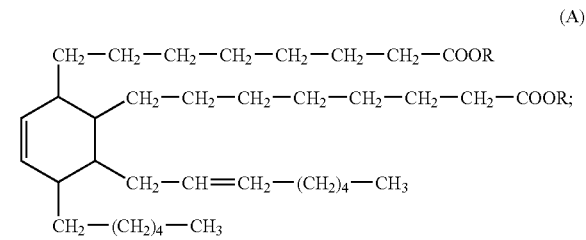

(A)

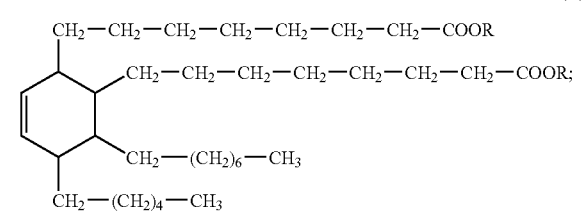

(B)

and

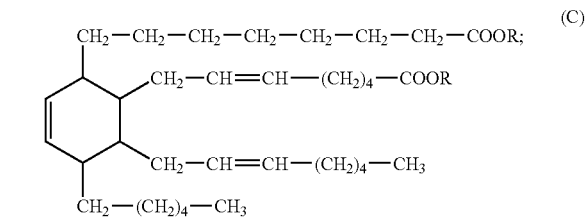

(C)

wherein each R, same or different, in formulas (A), (B), and (C) is a $C_3$–$C_{24}$ preferably $C_3$–$C_{18}$ hydrocarbon chain, more preferably $C_6$–$C_{18}$, straight chain or branched, saturated or unsaturated containing 1 to 3 carbon-to-carbon double bonds.

RX-13804 and RX-13824 are the subject plasticizers of several of the exemplified compositions reported in the Examples, and are additional examples of dimerate esters in accordance with formula I. RX-13804 is formed by the reaction of a predominantly $C_{36}$ dimer acid with 2-ethylhexyl alcohol. RX-13824 is formed by the reaction of a predominantly $C_{36}$ dimer acid with tridecyl alcohol. An additional example of a plasticizer in accordance with formula I is formed by the reaction of a predominantly $C_{36}$ dimer acid with oleyl alcohol.

A representative example of the triester (trimerate ester) of formula II is the following structure (D):

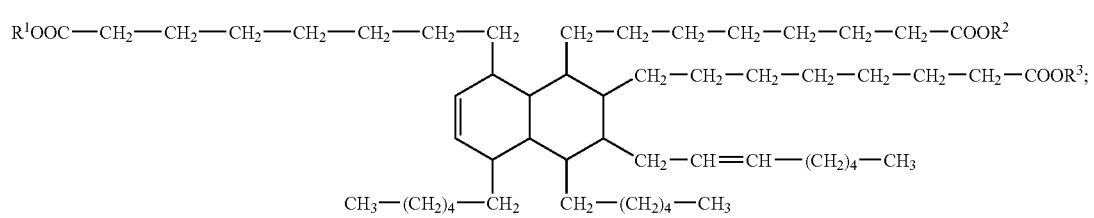

wherein each $R^1$, $R^2$, and $R^3$, same or different, is a $C_3$–$C_{24}$, preferably $C_3$–$C_{18}$, more preferably $C_6$–$C_{18}$ hydrocarbon chain, straight chain or branched, saturated or unsaturated containing 1 to 3 carbon-to-carbon double bonds.

In the present description, the term dimerate is sometimes used by itself when referring to a blend including structures of formulas I and II (i.e., blend including dimerates and trimerates).

The cyclic ester plasticizers of formula I, II, or mixtures thereof are typically added to an elastomer composition comprising natural and/or synthetic rubber in an amount of about 0.1 parts to about 50 parts by weight, preferably from ranges about 2 parts to about 40 parts, more preferably from about 10 parts to about 35 parts per 100 parts by weight of rubber.

A particularly useful blend of carboxylic acids for forming cyclic esters in accordance with the disclosure is a blend of carboxylic acids having CAS#: 61788-89-4, and known as dimer acid. Dimer acid is a blend including primarily $C_{36}$ and $C_{54}$ dimer and trimer acids, and predominantly (more than 50% by weight) $C_{36}$ dimer acid.

The fatty acid residues or hydrocarbon chains $R^5$, $R^7$, $R^{12}$, $R^{14}$ and $R^{18}$ of the esters of formulas I and II can be any $C_3$–$C_{24}$, preferably $C_6$–$C_{24}$, more preferably $C_8$–$C_{18}$ hydrocarbon chain, either saturated or containing 1 to 6, preferably 1 to 3, carbon-to-carbon double bonds, and may be derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., ($C_{24-6}$) indicates a hydrocarbon chain having 24 carbon atoms and 6 double bonds: hexanoic ($C_{6-0}$); octanoic ($C_{8-0}$); decanoic ($C_{10-0}$); dodecanoic ($C_{12-0}$); 9-dodecenoic (CIS) ($C_{12-1}$); tetradecanoic ($C_{14-0}$); 9-tetradecenoic (CIS) ($C_{14-1}$); hexadecanoic (CIS) ($C_{16-0}$); 9-hexadecenoic (CIS) ($C_{16-1}$); octadecanoic ($C_{18-0}$); 9-octadecenoic (CIS) ($C_{18-1}$); 9,12-octadecadienoic (CIS, CIS) ($C_{18-2}$); 9,12,15-octadecatrienoic (CIS, CIS, CIS) ($C_{18-3}$); 9,11,13-octadecatrienoic (CIS, TRANS, TRANS) ($C_{18-3}$); octadecatetraenoic ($C_{18-4}$); eicosanoic ($C_{20}$); 11-eicosenoic (CIS) ($C_{20-1}$); eicosadienoic ($C_{20-2}$); eicosatrienoic ($C_{20-3}$); 5,8,11,14-eicosatetraenoic ($C_{20-4}$); eicosapentaenoic ($C_{20-5}$); docosanoic ($C_{22}$); 13-docosenoic (CIS) ($C_{22-1}$); docosatetraenoic ($C_{22-4}$); 4,8,12,15,19-docosapentaenoic ($C_{22-5}$); docosahexaenoic ($C_{22-6}$); tetracosenoic ($C_{24-1}$); and 4,8,12,15,18,21-tetracosahexaenoic ($C_{24-6}$).

Commercially available blends of useful polybasic acids that can be reacted with $C_3$–$C_{24}$, preferably $C_3$–$C_{18}$, more preferably $C_6$–$C_{18}$ alcohols, straight chain or branched, saturated, or unsaturated containing 1 to 3 carbon-to-carbon double bonds to produce the dimerate and trimerate esters, as blends, include the following: EMPOL® 1010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Polybasic Acid; and similar PRIPOL™ products from Uniqema as well as UNIDYME® products from Arizona Chemical.

Particularly useful ester additives are made by reacting any of the long chain mono, dimer and/or trimer acids with one or more straight chain or branched $C_3$–$C_{24}$, preferably $C_3$–$C_{18}$, more preferably $C_6$–$C_{18}$ alcohols to produce esters in accordance with formulas I and II. The above dimer, trimer, and polybasic acids are produced by dimerizing, trimerizing, and polymerizing (oligomerizing) carboxylic acids, typically $C_{18}$ fatty acids. The fatty acids are typically mixtures. For example, the dimer acid produced from a $C_{18}$ carboxylic acids (e.g., a mixture of stearic, oleic, linoleic, and linolenic) will result in a blend of numerous cyclic dimerate and trimerate esters, as in formulas I and II, some saturated and some containing hydrocarbon chains having 1 to 6, generally 1 to 3 carbon-to-carbon double bonds. Any one or any blend of the esters that include the cyclic dimerate and/or cyclic trimerate esters in accordance with formulas I or II will function to plasticize elastomers, and provide a balance of flexibility, strength, and low temperature properties, with essentially no bleeding of the plasticizer to the surface of an elastomeric article. Particularly, the plasticized elastomeric compositions described herein are characterized in that the low temperature properties are improved to provide a balance of good flexibility and strength at low temperatures.

Rubbers useful in the compositions described herein can be natural rubbers (NR) and/or synthetic rubbers.

Synthetic rubbers include homopolymers of conjugated diene compounds such as isoprene, butadiene, chloroprene, and the like, for example, polyisoprene rubber (IR), polybutadiene rubber (BR), polychloroprene rubber, and the like; copolymers of the above described conjugated diene compounds with vinyl compounds such as styrene, acrylonitrile, vinyl pyridine, acrylic acid, methacrylic acid, alkyl acrylates, alkyl methacrylates, and the like, for example, styrene-butadiene copolymeric rubber (SBR), vinylpyridine-butadiene-styrene copolymeric rubber, acrylonitrile-butadiene copolymeric rubber, acrylic acid-butadiene copolymeric rubber, methacrylic acid-butadiene copolymeric rubber, methyl acrylate-butadiene copolymeric rubber, methyl methacrylate-butadiene copolymeric rubber, acrylonitrile-butadiene-styrene terpolymer, and the like; copolymers of olefins, such as ethylene, propylene, isobutylene, and the like with dienes, for example, isobutylene-isoprene copolymeric rubber (IIR); copolymers of olefins with non-conjugated dienes such as ethylene propylene diene monomer (EPDM), for example, ethylene-propylene-cyclopentadiene terpolymer, ethylene-propylene-5-ethylidene-2-norbornene terpolymer and ethylene-propylene-1,4-hexadiene terpolymer; polyalkenamer obtained by ring opening polymerization of cycloolefins, for example, polypentenamer; rubbers obtained by ring opening polymerization of oxirane ring, for example, polyepichlorohydrin rubber and polypropylene oxide rubber which can be vulcanized with sulfur, and the like. Furthermore, halides of the above-described various rubbers, for example, chlorinated isobutylene-isoprene copolymeric rubber (Cl-IIR), brominated isobutylene-isoprene copolymeric rubber (Br-IIR), fluorinated polyethylene, and the like are similarly included.

Particularly, the compositions described herein are characterized in that low temperature properties of natural rubber (NR), and synthetic rubbers, e.g. styrene-butadiene copolymeric rubber (SBR), polybutadiene rubber (BR), polyisoprene rubber (IR), isobutylene-isoprene, copolymeric rubber, halides of these rubbers (Cl-IIR, Br-IIR) and copolymers of olefins with non-conjugated dienes are improved to provide the rubbers with a balance of good flexibility and strength at low temperatures. Of course, the present invention can be applied to other rubbers. All these rubbers may be kneaded with compounding agents conventionally used for compounding with rubber, for example, fillers, such as carbon black, silica, calcium carbonate, lignin and the like, softening agents, such as mineral oils, vegetable oils, prior to vulcanization and then vulcanized.

In order to cure a rubber composition a vulcanizing agent such as a sulfur or peroxide vulcanizing agent is dispersed throughout the composition. The amount of vulcanizing agent, e.g., sulfur, in the composition is typically from about 2 to about 8 parts, for example from about 3 to about 6, by weight per 100 parts by weight of natural and/or synthetic rubber, but lesser or larger amounts, for example, from about 1 to 7 or 8 parts may be employed on the same basis. A preferred range is from about 2.5 to about 6 parts per 100 parts by weight of rubber. Representative examples of sulfur vulcanizing agents include elemental sulfur ($S_8$), amine disulfides, polymeric polysulfides, and sulfur olefin adducts. Preferably, the sulfur vulcanizing agent is elemental sulfur.

The term "vulcanization" used herein means the introduction of three dimensional cross-linked structures between rubber molecules. Thus, thiuram vulcanization, peroxide vulcanization, quinoid vulcanization, resin vulcanization, metal salt vulcanization, metal oxide vulcanization, polyamine vulcanization, radiation vulcanization, hexamethylenetetramine vulcanization, urethane cross-linker vulcanization and the like are included in addition to sulfur vulcanization, which is usual and most important.

Accelerators may be used to control the time and/or temperature required for vulcanization and to improve the properties of the vulcanizate. The accelerator(s) may be used in total amounts ranging from about 0.3 parts to about 4 parts, for example about 0.3 parts to about 1.5 parts, preferably from about 0.4 parts to about 1.0 parts, and more preferably from about 0.5 parts to about 0.8 parts by weight per 100 parts by weight of natural and/or synthetic rubbers. Suitable types of accelerators that may be used are amines, disulfides, guanidines, thioureas, thiazoles, thiurams, sulfenamides, dithiocarbamates, and xanthates. If included in the rubber composition, the primary accelerator preferably is typically a sulfenamide. If a second accelerator is used, the secondary accelerator is preferably a guanidine, dithiocarbamate, or thiuram compound. Specific examples of vulcanization accelerators which can be used in the rubber compositions described herein are thiazole-based accelerators, for example 2-mercaptobenzothiazole, bis(2-benzothiazolyl)disulphide, 2(2',4'-dinitro-phenylthio)benzothiazole, benzothiazole-2-sulphenamides, for instance N-isopropyl-benzothiazole-2-sulphenamide, N-tert-butyl-benzothiazole-2-sulphenamide, N-cyclo-hexylbenzo-thiazole-2-sulphen-amide, and 2(morpholinothio)benzothiazole, and thiocarbamylsulphenamides, for example N,N-dimethyl-N',N'-dicyclohexylthiocarba-moylsulphenamide, and N(morpholinothiocarbonylthio)morpholine.

The commonly employed carbon blacks used in conventional rubber compounding applications can be used as the carbon black in this invention. Representative examples of such carbon blacks include N110, N121, N220, N231, N234, N242, N293, N299, S315, N326, N330, M332, N339, N343, N347, N351, N358, and N375.

The rubber compositions described herein are compounded by methods generally known in the rubber compounding art, such as mixing the various sulfur-vulcanizable or peroxide-vulcanizable constituent rubbers with various commonly used additive materials such as, for example, sulfur donors, curing aids, such as activators and retarders, and processing additives, such as oils, resins including tackifying resins and other conventional plasticizers, fillers, pigments, fatty acid, zinc oxide, waxes, antioxidants and antiozonants, retarders, and peptizing agents. As known to those skilled in the art, the additives mentioned above are selected and commonly used in conventional amounts for tire tread applications. A typical amount of adhesive resins is about 0.2 parts to about 10 parts per 100 parts by weight of the natural and/or synthetic rubbers, usually about 1 part to about 5 parts.

Typical amounts of zinc oxide comprise about 2 parts to about 5 parts per 100 parts by weight of natural and/or synthetic rubbers. Typical amounts of waxes comprise about 1 part to about 5 parts per 100 parts by weight of natural and/or synthetic rubbers. Often microcrystalline waxes are used. Typical amounts of retarders range from about 0.05 parts to about 2 parts per 100 parts by weight of natural and/or synthetic rubbers. Typical amounts of peptizers comprise about 0.1 parts to about 1 part per 100 parts by weight of natural and/or synthetic rubbers. Typical peptizers may be, for example, pentachlorothiophenol and dibenzamidodiphenyl disulfide. All additive percentages and amounts are based on the weight of natural and/or synthetic rubbers.

Vulcanization of the rubber composition described herein is generally carried out at conventional temperatures ranging from about 100° C. to about 200° C. Preferably, the vulcanization is conducted at temperatures ranging from about 110° C. to about 180° C. Any of the usual vulcanization processes may be used such as heating in a press or mold, heating with superheated steam or hot air, or in a salt bath.

Upon vulcanization of the rubber composition at a temperature ranging from about 100° C. to about 200° C., the rubber composition can be used for various purposes. For example, the vulcanized rubber composition may be in the form of a tire, belt, hose, motor mounts, gaskets and air springs. In the case of a tire, it can be used for various tire components. Such tires can be built, shaped, molded, and cured by various methods which are known and will be readily apparent to those having skill in such art. When the rubber composition is used in a tire, its use may be in a wire coat, bead coat, tread, apex, sidewall, and combination thereof. As can be appreciated, the tire may be a passenger tire, aircraft tire, truck tire, and the like. Preferably, the tire is a passenger tire. The tire may also be a radial or bias, with a radial tire being preferred.

The invention may be better understood by reference to the following examples in which parts and percentages are by weight unless otherwise indicated.

In the following examples, cyclic dimerate esters were applied to EPDM (Royalene 501 and Royalene 502), natural rubber, and neoprene. Previous work determined that conventional organic esters were either incompatible or too volatile for many elastomer applications.

The following Tables I-VI include original physical properties, processing and curing properties, compatibility, low temperature, and heat aging data for elastomeric compositions which have been plasticized with representative dimerate ester compositions or previously known plasticizers. The dimerate esters were evaluated at 30 parts per hundred parts by weight of natural and/or synthetic rubbers (phr) and compared to a conventional paraffinic oil at 60 phr (i.e., the conventional rubber plasticizer was added to an elastomer composition at twice the amount of the rubber plasticizers disclosed herein).

Results

Table I illustrates the use of dimerate esters and conventional plasticizers in an EPDM compound. The processing and curing properties show no major differences when compared with paraffinic oils except that since the dimerates are evaluated at lower phr they do produce higher viscosity compounds. Compatibility data (i.e., lack of roll spew) show all dimerate esters evaluated in Table I are compatible with EPDM. The dimerate esters provide higher tensile strength and hardness values than other plasticizers.

Table I shows the low temperature properties for elastomers plasticized with various compounds. The low temperature properties of the compositions plasticized with the dimerate esters are highly significant in comparison to elastomers plasticized with paraffinic oil. Elastomers plasticized with the dimerates possess better lower temperature properties than elastomers plasticized with paraffinic oil, even though the dimerates are at 30 phr and paraffinic oil is at 60 phr. Elastomers plasticized with dimerates exhibit an unexpected combination of high strength and hardness with excellent low temperature properties, and such properties can have importance in applications such as V-belts, radiator hoses, automotive insulation, seals and gaskets.

The air oven aging results show that the dimerates are essentially equal to the paraffinic oil in weight loss. The dimerate esters are significantly lower in volatility when compared to the tallate esters, RX-13577 and RX-13782.

TABLE I

| Example | 1 | 2 | 3 | 4 | 5 | 6 |
|---|---|---|---|---|---|---|
| Royalene 501 | 100.00 | → | | | | |
| N-550 | 60.00 | → | | | | |
| Kadox 930 | 5.00 | → | | | | |
| Stearic Acid | 1.00 | → | | | | |
| RX-13577 | 30.00 | — | — | — | — | — |
| RX-13782 | — | 30.00 | — | — | — | — |
| RX-13804 | — | — | 30.00 | — | — | — |
| RX-13805 | — | — | — | 30.00 | — | — |
| RX-13806 | — | — | — | — | 30.00 | — |
| SUNPAR 2280 | — | — | — | — | — | 60.00 |
| Subtotal | 196.00 | 196.00 | 196.00 | 196.00 | 196.00 | 226.00 |
| Mill Addition | | | | | | |
| Spider Sulfur | 0.80 | → | | | | |
| Premix MBT | 0.9375 | → | | | | |
| Premix TMTD | 0.625 | → | | | | |
| Premix DPTT | 0.625 | → | | | | |
| Premix TDEC | 0.625 | → | | | | |
| Total | 199.61 | 199.61 | 199.61 | 199.61 | 199.61 | 229.61 |
| Major Variable | RX-13577 | RX-13782 | RX-13804 | RX-13805 | RX-13806 | SUNPAR 2280 |
| Processing Properties | | | | | | |
| Viscosity and Curing Properties | | | | | | |
| Mooney Viscosity at 135° C.(275° F.) | | | | | | |
| Minimum Viscosity | 22 | 21.3 | 25.9 | 26.4 | 25.3 | 13 |
| t5, minutes | 7.9 | 7.8 | 5.9 | 5.9 | 5.9 | 9 |
| t10, minutes | 9.3 | 9.1 | 7.2 | 7.2 | 7.1 | 10.8 |

TABLE I-continued

| | | | | | | |
|---|---|---|---|---|---|---|
| t35, minutes | 18.3 | 20.3 | 9.6 | 9.9 | 9.7 | 14.7 |
| Oscillating Disc Rheometer at 160°(320° F.) | | | | | | |
| $M_L$ | 4.4 | 4.1 | 5.1 | 5.2 | 5 | 2.3 |
| $M_H$ | 17.9 | 15.9 | 28.1 | 28.7 | 28.2 | 17.4 |
| $t_s2$, minutes | 2.7 | 2.8 | 2.3 | 2.3 | 2.2 | 3.3 |
| t'c(90), minutes | 7.3 | 6.8 | 5.7 | 6 | 5.5 | 7.8 |
| 1.25*t'c(90), minutes | 9.2 | 8.5 | 7.1 | 7.5 | 6.9 | 9.8 |
| Cure Rate Index | 21.5 | 25 | 29.9 | 27.3 | 30 | 22.2 |
| Vulcanizate Properties | | | | | | |
| Roll Spew | | | | | | |
| Temperature @ −40° C. | | | | | | |
| 24 hours | NONE | NONE | NONE | NONE | NONE | NONE |
| 48 hours | NONE | NONE | NONE | NONE | NONE | NONE |
| 72 hours | NONE | NONE | NONE | NONE | NONE | NONE |
| 96 hours | NONE | NONE | NONE | NONE | NONE | NONE |
| Temperature @ −3° C. | | | | | | |
| 24 hours | NONE | NONE | NONE | NONE | NONE | NONE |
| 48 hours | NONE | NONE | NONE | NONE | NONE | NONE |
| 72 hours | NONE | NONE | NONE | NONE | NONE | NONE |
| 96 hours | NONE | NONE | NONE | NONE | NONE | NONE |
| Temperature @ 25° C. | | | | | | |
| 24 hours | NONE | NONE | NONE | NONE | NONE | NONE |
| 48 hours | NONE | NONE | NONE | NONE | NONE | NONE |
| 72 hours | NONE | NONE | NONE | NONE | NONE | NONE |
| 96 hours | NONE | NONE | NONE | NONE | NONE | NONE |

| Example | 1 | 2 | 3 | 4 | 5 | 6 |
|---|---|---|---|---|---|---|
| Original Physical Properties | | | | | | |
| Stress @ 100% Elongation, MPa, | 0.8 | 0.7 | 1.6 | 1.8 | 1.6 | 1.3 |
| psi | 114 | 101 | 236 | 256 | 234 | 188 |
| Stress @ 200% Elongation, MPa | 1.1 | 0.9 | 3.2 | 3.5 | 3.2 | 2.7 |
| Stress @ 300% Elongation, MPa | 1.6 | 1.2 | 4.8 | 5.2 | 4.8 | 4.2 |
| Tensile Ultimate, MPa, | 3.0 | 2.0 | 14.4 | 14.8 | 14.7 | 12.1 |
| psi | 435 | 288 | 2094 | 2148 | 2126 | 1751 |
| Elongation @ Break, % | 744 | 640 | 734 | 689 | 724 | 669 |
| Hardness Duro A, pts. | 51 | 50 | 57 | 58 | 57 | 49 |
| Specific Gravity | 1.062 | 1.062 | 1.067 | 1.070 | 1.067 | 1.038 |
| Compression Set, % 22 hrs. @ 100° C. | 92 | 92 | 69 | 71 | 75 | 68 |
| Low Temperature Properties | | | | | | |
| Low Temperature Impact - Brittleness | | | | | | |
| Brittle Point, as molded, all pass, ° C. | <−75 | <−75 | <−75 | −71 | <−75 | −72 |
| After air oven aging, all pass, ° C. | <−75 | −72 | <−75 | <−75 | <−75 | <−75 |
| Low Temperature Torsion - Gehman | | | | | | |
| As molded, Relative Modulus | | | | | | |
| T2, ° C. | −4 | −6 | −21 | −26 | −13 | −26 |
| T5, ° C. | −39 | −34 | −51 | −47 | −33 | −41 |
| T10, ° C. | −55 | −43 | −55 | −55 | −44 | −46 |
| T100, ° C. | −67 | −70 | −66 | −65 | −61 | −55 |
| Apparent Modulus of Rigidity | 83.3 | 90.5 | 128.8 | 149.8 | 131.9 | 95.5 |
| Temperature at 500 psi, ° C. | | | | | | |
| 500 psi, ° C. | −47 | −35 | −43 | −39 | −28 | −41 |
| 5,000 psi, ° C. | −65 | −59 | −62 | −59 | −56 | −53 |
| 10,000 psi ° C. | −68 | −68 | −65 | −62 | −59 | −55 |
| 25,000 psi, ° C. | −72 | −75 | −68 | −75 | −75 | −60 |
| 50,000 psi, ° C. | −75 | <−75 | −75 | <−75 | <−75 | −70 |
| Aged Vulcanizate Properties | | | | | | |
| Air Oven Aging, 70 h @ 150° C. | | | | | | |
| Stress @ 100% Elongation, MPa, | 8.4 | 9.0 | 5.4 | 5.7 | 5.2 | 3.0 |
| psi | 1216 | 1307 | 777 | 823 | 749 | 433 |
| Stress Change, % | 970 | 1199 | 230 | 221 | 219 | 131 |
| Tensile Ultimate, MPa, | 10.5 | 11.6 | 7.9 | 9.8 | 8.9 | 7.6 |
| psi | 1520 | 1689 | 1151 | 1428 | 1290 | 1109 |
| Tensile Change, % | 250 | 486 | −45 | −34 | −39 | −37 |
| Elongation @ Break, % | 127 | 131 | 140 | 163 | 160 | 207 |
| Elongation Change, % | −83 | −80 | −81 | −76 | −78 | −67 |
| Hardness Duro A, pts. | 80 | 82 | 75 | 71 | 68 | 57 |
| Hardness Change, pts. | 29 | 32 | 18 | 13 | 11 | 8 |
| Weight Change, % | −11 | −12 | −2.4 | −2.3 | −2.0 | −1.5 |

The next experiments with dimerate esters were in an EPDM having a different ethylene/propylene ratio (Royalene 502). Again, dimerate esters were evaluated at 30 phr and compared to a conventional paraffinic oil at 60 phr.

Results

The processing and curing properties of the EPDM compositions plasticized with dimerates show no major differences when compared with elastomer compositions plasticized with paraffinic oils except that since the dimerates are evaluated at lower phr they do produce higher viscosity compounds. Compatibility data (i.e., lack of roll spew) show all esters evaluated in Table II are compatible with EPDM. The dimerate esters provide higher tensile strength and hardness values than other plasticizers.

Table II shows the low temperature properties for elastomers plasticized with various compounds. The low temperature properties of the compositions plasticized with the dimerate esters are highly significant in comparison to elastomers plasticized with paraffinic oil. Elastomers plasticized with the dimerates possess better lower temperature properties than elastomers plasticized with paraffinic oil, even though the dimerates are at 30 phr and paraffinic oil is at 60 phr. Elastomers plasticized with dimerates exhibit an unexpected combination of high strength and hardness with excellent low temperature properties, and such properties can have importance in applications such as V-belts, radiator hoses, automotive insulation, seals and gaskets.

The air oven aging results show that the dimerates are essentially equal to the paraffinic oil in weight loss, which is a significant improvement over conventional organic ester plasticizers and tallate compounds.

TABLE II

| Example | 7 | 8 | 9 | 10 | 11 | 12 |
|---|---|---|---|---|---|---|
| Royalene 502 | 100.00 | → | | | | |
| N-550 | 60.00 | → | | | | |
| Kadox 930 | 5.0 | → | | | | |
| Stearic Acid | 1.0 | → | | | | |
| RX-13577 | 30.00 | → | | | | |
| RX-13782 | — | 30.00 | — | — | — | — |
| RX-13804 | — | — | 30.00 | — | — | — |
| RX-13805 | — | — | — | 30.00 | — | — |
| RX-13806 | — | — | — | — | 30.00 | — |
| SUNPAR 2280 | — | — | — | — | — | 60.00 |
| Subtotal | 196.00 | 196.00 | 196.00 | 196.00 | 196.00 | 226.00 |
| Mill Addition | | | | | | |
| Spider Sulfur | 0.80 | → | | | | |
| Premix MBT | 0.94 | → | | | | |
| Premix TMTD | 0.63 | → | | | | |
| Premix DPTT | 0.63 | → | | | | |
| Premix TDEC | 0.63 | → | | | | |
| Total | 199.61 | 199.61 | 199.61 | 199.61 | 199.61 | 229.61 |
| Major Variable | RX-13577 | RX-13782 | RX-13804 | RX-13805 | RX-13806 | SUNPAR2280 |
| Processing Properties | | | | | | |
| Viscosity and Curing Properties | | | | | | |
| Mooney Viscosity at 135° C.(275° F.) | | | | | | |
| Minimum Viscosity | 41.7 | 40.1 | 48.4 | 49.3 | 48.6 | 26 |
| t5, minutes | 6.8 | 6.6 | 4.7 | 4.6 | 4.8 | 7.3 |
| t10, minutes | 7.9 | 7.5 | 5.6 | 5.4 | 5.7 | 8.8 |
| t35, minutes | 10.6 | 9.8 | 7.8 | 7.4 | 7.8 | 11.8 |
| Oscillating Disc Rheometer at 160° C.(320° F.) | | | | | | |
| $M_L$ | 9.8 | 9.4 | 11.1 | 10.8 | 11.1 | 5.5 |
| $M_H$ | 35 | 33 | 47.5 | 42.5 | 44.7 | 29.2 |
| $T_S2$, minutes | 2.2 | 2.2 | 1.8 | 1.8 | 1.7 | 2.5 |
| t'c(90), minutes | 6.3 | 6 | 5.5 | 5.8 | 5.2 | 7.8 |

TABLE II-continued

|  |  |  |  |  |  |  |
|---|---|---|---|---|---|---|
| 1.25*t'c(90), minutes | 7.9 | 7.5 | 6.9 | 7.3 | 6.5 | 9.8 |
| Cure Rate Index | 24 | 26.1 | 27.3 | 25 | 28.6 | 18.8 |
| Vulcanizate Properties |  |  |  |  |  |  |
| Roll Spew |  |  |  |  |  |  |
| Temperature @ −40° C. |  |  |  |  |  |  |
| 24 hours | NONE | NONE | NONE | NONE | NONE | NONE |
| 48 hours | NONE | NONE | NONE | NONE | NONE | NONE |
| 72 hours | NONE | NONE | NONE | NONE | NONE | NONE |
| 96 hours | NONE | NONE | NONE | NONE | NONE | NONE |
| Temperature @ −3° C. |  |  |  |  |  |  |
| 24 hours | NONE | NONE | NONE | NONE | NONE | NONE |
| 48 hours | NONE | NONE | NONE | NONE | NONE | NONE |
| 72 hours | NONE | NONE | NONE | NONE | NONE | NONE |
| 96 hours | NONE | NONE | NONE | NONE | NONE | NONE |
| Temperature @ 25° C. |  |  |  |  |  |  |
| 24 hours | NONE | NONE | NONE | NONE | NONE | NONE |
| 48 hours | NONE | NONE | NONE | NONE | NONE | NONE |
| 72 hours | NONE | NONE | NONE | NONE | NONE | NONE |
| 96 hours | NONE | NONE | NONE | NONE | NONE | NONE |

| Example | 7 | 8 | 9 | 10 | 11 | 12 |
|---|---|---|---|---|---|---|
| Original Physical Properties |  |  |  |  |  |  |
| Stress @ 100% Elongation, MPa, | 1.0 | 0.9 | 2.0 | 2.0 | 1.8 | 1.5 |
| psi | 150 | 137 | 290 | 287 | 259 | 215 |
| Stress @ 200% Elongation, MPa | 1.6 | 1.4 | 4.2 | 4.2 | 3.8 | 3.2 |
| Stress @300% Elongation, MPa | 2.5 | 2.1 | 6.4 | 6.4 | 5.8 | 5 |
| Tensile Ultimate, MPa, | 11.2 | 9.0 | 15.3 | 15.3 | 14.7 | 12.1 |
| psi | 1629 | 1301 | 2216 | 2221 | 2126 | 1752 |
| Elongation @ Break, % | 1878 | 1867 | 580 | 576 | 606 | 573 |
| Hardness Duro A, pts. | 55 | 52 | 60 | 60 | 59 | 50 |
| Specific Gravity | 1.063 | 1.064 | 1.068 | 1.071 | 1.069 | 1.038 |
| Compression Set, % 22 hrs. @ 100° C. | 68 | 75 | 56 | 53 | 57 | 58 |
| Low Temperature Properties |  |  |  |  |  |  |
| Low Temperature Impact - Brittleness |  |  |  |  |  |  |
| Brittle Point, as molded, all pass, ° C. | <−75 | <−75 | −73 | −73 | <−75 | −60 |
| After Air Oven Aging, all pass, ° C. | <−75 | <−75 | <−75 | <−75 | <−75 | <−75 |
| Low Temperature Torsion - Gehman |  |  |  |  |  |  |
| As molded, Relative Modulus |  |  |  |  |  |  |
| T2, ° C. | −14 | −12 | −25 | −25 | −15 | −21 |
| T5, ° C. | −44 | −33 | −47 | −46 | −31 | −39 |
| T10, ° C. | −54 | −44 | −52 | −52 | −40 | −46 |
| T100, ° C. | −68 | −60 | −66 | −66 | −57 | −54 |
| Apparent Modulus of Rigidity | 160.5 | 159.8 | 191.4 | 204.3 | 185.4 | 123.5 |
| Temperature at |  |  |  |  |  |  |
| 500 psi, ° C. | −35 | −29 | −33 | −30 | −21 | −38 |
| 5,000 psi, ° C. | −63 | −54 | −57 | −56 | −49 | −49 |
| 10,000 psi, ° C. | −66 | −58 | −60 | −59 | −52 | −53 |
| 25,000 psi, ° C. | −70 | −75 | −66 | −65 | −70 | −60 |
| 50,000 psi, ° C. | −75 | <−75 | −75 | <−75 | <−75 | <−75 |
| Aged Vulcanizate Properties |  |  |  |  |  |  |
| Air Oven Aging, 70 h @ 150° C. |  |  |  |  |  |  |
| Stress @ 100% Elongation, MPa, | 9.1 | 9.6 | 5.8 | 5.9 | 5.7 | 3.3 |
| psi | 1321 | 1399 | 847 | 860 | 829 | 479 |
| Stress Change, % | 781 | 921 | 192 | 200 | 220 | 123 |
| Tensile Ultimate, MPa, | 11.1 | 13.5 | 10.6 | 12.4 | 11.7 | 9.3 |
| psi | 1612 | 1957 | 1532 | 1795 | 1699 | 1356 |
| Tensile Change, % | −1 | 50 | −31 | −19 | −20 | −23 |
| Elongation @ Break, % | 125 | 148 | 169 | 194 | 184 | 227 |
| Elongation Change, % | −93 | −92 | −71 | −66 | −70 | −60 |
| Hardness Duro A, pts. | 82 | 83 | 73 | 72 | 71 | 61 |
| Hardness Change, pts. | 27 | 31 | 13 | 12 | 12 | 11 |
| Weight Change, % | −11 | −11.8 | −2.3 | −2.3 | −2 | −1.8 |

The data of Table III shows results from the evaluation of different dimerate esters in EPDM-Royalene 501. Again, the dimerate esters were evaluated at 30 phr and compared to a conventional paraffinic oil at 60 phr.

Results

The processing and curing properties show no major differences when compared with paraffinic oils except that since the dimerates are evaluated at lower phr they do produce higher viscosity compounds. The dimerate esters evaluated in Table III are compatible with the elastomers. The dimerate esters also provide higher tensile strength and hardness values than other plasticizers.

Table III shows the low temperature properties for elastomers plasticized with various compounds. The low temperature properties of the compositions plasticized with the dimerate esters are highly significant in comparison to elastomers plasticized with paraffinic oil. Elastomers plasticized with the dimerates possess better lower temperature properties than elastomers plasticized with paraffinic oil, even though the dimerates are at 30 phr and paraffinic oil is at 60 phr. Elastomers plasticized with dimerates exhibit an unexpected combination of high strength and hardness with excellent low temperature properties, and such properties can have importance in applications such as V-belts, radiator hoses, automotive insulation, seals and gaskets.

Additionally, the elastomeric composition of Example 15, which was plasticized with dioctyl sebacate shows roll spew at all temperatures tested, even at room temperature (25° C.). Thus, Example 15 indicates that conventional plasticizers, more specifically linear diesters, are not sufficiently compatible with elastomeric compositions so as to provide superior low temperature properties.

The air oven aging results show that the dimerates are essentially equal to the paraffinic oil in weight loss, but the air oven loss for the dimerate esters is significantly less than when conventional plasticizers such as dioctyl sebacate, and tallate compounds are used.

Glass transition data for the EPDM compositions plasticized with dimerate esters RX-13804 and RX-13824 further illustrate the efficacy of the disclosed plasticizers. For example, the disclosed plasticizers provide glass transition temperatures in EPDM which are comparable to those achieved with the conventional plasticizers, dioctyl sebacate and paraffinic oil (even though a significantly lower content of the dimerate plasticizer is used to plasticize the EPDM).

TABLE III

| Example | 3 | 13 | 14 | 15 | 16 |
|---|---|---|---|---|---|
| Royalene 501 | 100.00 | → | | | |
| N-550 | 60.00 | → | | | |
| Kadox 930 | 5.00 | → | | | |
| Stearic Acid | 1.00 | → | | | |
| RX-13804 | 30.00 | — | — | — | — |
| RX-13824 | — | 30.00 | — | — | — |
| RX-13853 | — | — | 30.00 | — | — |
| Plasthall DOS | — | — | — | 30.00 | — |
| Sunpar 2280 | — | — | — | — | 60.00 |
| Subtotal | 196.00 | 196.00 | 196.00 | 196.00 | 226.00 |
| Mill Addition | | | | | |
| Sulfur | 0.80 | → | | | |
| Premix MBT | 0.94 | → | | | |
| Premix TMTD | 0.63 | → | | | |
| Premix DPTT | 0.63 | → | | | |
| Premix TDEC | 0.63 | → | | | |
| Total | 199.61 | 199.61 | 199.61 | 199.61 | 229.61 |
| Major Variable | RX-13804 | RX-13824 | RX-13853 | Plasthall DOS | Sunpar 2280 |
| Processing Properties Viscosity and Curing Properties Mooney Viscosity at 275° F.(135° C.) | | | | | |
| Minimum Viscosity | 27.2 | 29 | 24.5 | 27.5 | 15.4 |
| t5, minutes | 6.2 | 6.6 | 8.2 | 5.7 | 9 |
| t10, minutes | 7.4 | 7.8 | 9.3 | 6.8 | 10.8 |
| t35, minutes | 10.1 | 10.5 | 17.2 | 9.1 | 14.6 |

TABLE III-continued

| Oscillating Disc Rheometer at 320° F.(160° C.) | | | | | |
|---|---|---|---|---|---|
| $M_L$ | 4.9 | 6 | 4.4 | 5.2 | 2.5 |
| $M_H$ | 32.7 | 37.1 | 20.6 | 42.6 | 21 |
| $t_S 2$, minutes | 2.3 | 2.3 | 2.7 | 2.2 | 3 |
| t'c(90), minutes | 5.2 | 5.7 | 7 | 6.2 | 7.5 |
| 1.25*t'c(90), minutes | 6.5 | 7.1 | 8.8 | 7.7 | 9.4 |
| Cure Rate Index | 35.2 | 29.9 | 23.1 | 25 | 22.2 |
| Vulcanizate Properties | | | | | |
| Roll Spew | | | | | |
| Temperature @ −40° C. | | | | | |
| 24 hours | NONE | NONE | NONE | YES | NONE |
| 48 hours | NONE | NONE | NONE | YES | NONE |
| 72 hours | NONE | NONE | NONE | YES | NONE |
| 96 hours | NONE | NONE | NONE | YES | NONE |
| Temperature @ −3° C. | | | | | |
| 24 hours | NONE | NONE | NONE | YES | NONE |
| 48 hours | NONE | NONE | NONE | YES | NONE |
| 72 hours | NONE | NONE | NONE | YES | NONE |
| 96 hours | NONE | NONE | NONE | YES | NONE |
| Temperature @ 25° C. | | | | | |
| 24 hours | NONE | NONE | NONE | YES | NONE |
| 48 hours | NONE | NONE | NONE | YES | NONE |
| 72 hours | NONE | NONE | NONE | YES | NONE |
| 96 hours | NONE | NONE | NONE | YES | NONE |

| Example | 3 | 13 | 14 | 15 | 16 |
|---|---|---|---|---|---|
| Original Physical Properties | | | | | |
| Stress @ 100% Elongation, MPa, | 1.6 | 1.7 | 0.8 | 2.2 | 1.2 |
| psi | 225 | 240 | 120 | 315 | 170 |
| Stress @ 200% Elongation, MPa | 2.9 | 3.1 | 1.2 | 4.3 | 2.2 |
| Stress @ 300% Elongation, MPa | 4.2 | 4.5 | 1.6 | 6.2 | 3.4 |
| Tensile Ultimate, MPa, | 14.8 | 14.6 | 4.2 | 11.3 | 13.8 |
| psi | 2150 | 2120 | 615 | 1645 | 2005 |
| Elongation @ Break, % | 825 | 785 | 1000 | 555 | 815 |
| Hardness Duro A, pts. | 57 | 57 | 51 | 59 | 48 |
| Specific Gravity | 1.068 | 1.068 | 1.060 | 1.070 | 1.038 |
| Compression Set, % 22 hrs. @ 100° C. | 67 | 64 | 85 | 58 | 70 |
| Low Temperature Properties | | | | | |
| Low Temperature Impact - Brittleness | | | | | |
| Brittle Point, as molded, all pass, ° C. | >−75 | >−75 | >−75 | >−75 | −70 |
| After Air Oven Aging @ 150° C., all pass, ° C. | >−75 | >−75 | −70 | >−75 | −70 |
| After Air Oven Aging @ 169° C., all pass, ° C. | −60 | −65 | −70 | >−75 | −70 |
| Low Temperature Torsion - Gehman As molded, Relative Modulus | | | | | |
| T2, ° C. | −29 | −28 | −6 | −40 | −25 |
| T5, ° C. | −50 | −47 | −43 | −53 | −41 |
| T10, ° C. | −54 | −53 | −55 | −58 | −47 |
| T100, ° C. | −64 | −62 | −66 | −70 | −55 |
| Apparent Modulus of Rigidity Temperature at | 142.6 | 152 | 86.8 | 185.9 | 90.2 |
| 500 psi, ° C. | −42 | −39 | −47 | −46 | −42 |
| 5,000 psi, ° C. | −60 | −58 | −64 | −63 | −53 |
| 10,000 psi, ° C. | −64 | −61 | −67 | −66 | −55 |
| 25,000 psi, ° C. | −67 | −64 | −69 | −75 | −64 |
| 50,000 psi, ° C. | −70 | −70 | >75 | >−75 | −70 |
| Aged Vulcanizate Properties Air Oven Aging, 70 h @ 150° C.(302° F.) | | | | | |
| Stress ™ 100% Elongation, MPa, | 3.2 | 3.3 | 2.7 | 7.8 | 2.3 |
| psi | 465 | 475 | 390 | 1135 | 340 |
| Stress Change, % | 107 | 98 | 225 | 260 | 100 |
| Tensile Ultimate, MPa, | 11.1 | 12.5 | 10.7 | 14.6 | 10.7 |
| psi | 1610 | 1815 | 1550 | 2115 | 1555 |
| Tensile Change, % | −25 | −14 | 152 | 29 | −22 |
| Elongation @ Break, % | 310 | 350 | 410 | 185 | 365 |
| Elongation Change, % | −62 | −55 | −59 | −67 | −55 |

TABLE III-continued

| | | | | | |
|---|---|---|---|---|---|
| Hardness Duro A, pts. | 65 | 65 | 64 | 81 | 56 |
| Hardness Change, pts. | 8 | 8 | 13 | 22 | 8 |
| Weight Change, % | −1.8 | −1.8 | −3.5 | −15 | −1.5 |

| Example | 3 | 13 | 15 | 15 | 16 |
|---|---|---|---|---|---|
| Air Oven Aging, 70 h @ 169° C.(336° F.) | | | | | |
| Stress @ 100% Elongation, MPa | 4.8 | 5.1 | 7.2 | 11.9 | 2.6 |
| psi | 690 | 735 | 1040 | 1720 | 375 |
| Stress Change, % | 207 | 206 | 767 | 446 | 121 |
| Tensile Ultimate, MPa | 6.5 | 6.9 | 7.8 | 12.9 | 6.0 |
| psi | 940 | 1000 | 1130 | 1875 | 870 |
| Tensile Change, % | −56 | −53 | 84 | 14 | −57 |
| Elongation @ Break, % | 130 | 130 | 110 | 110 | 190 |
| Elongation Change, % | −84 | −83 | −89 | −80 | −77 |
| Hardness Duro A, pts. | 70 | 70 | 75 | 84 | 57 |
| Hardness Change, pts. | 13 | 13 | 24 | 25 | 9 |
| Weight Change, % | −3.4 | −3.2 | −8.3 | −15.4 | −3.4 |
| Glass Transition, $T_g$, ° C. | 55.1 | 53.4 | — | 61.7 | −50.3 |

Table IV compares the formulation of Example 3 to one containing UBS 020602, which has essentially the same molecular composition as RX-13804 (the ester additive in the formulation of Example 3), but is substantially hydrogenated. The study was done with the same elastomer used in Tables I and III (Royalene 501) and all tests were conducted the same as in Tables I–III. The main differences seen between the two formulations is the UBS 020602 provides moderately better heat aging properties, which could be significant for critical high temperature applications.

TABLE IV

| Example | 3 | 17 |
|---|---|---|
| Royalene 501 | 100.00 | → |
| N-550 | 60.00 | → |
| Kadox 930 | 5.00 | → |
| Stearic Acid | 1.00 | → |
| RX-13804 | 30.00 | — |
| UBS 020602 | — | 30.00 |
| Subtotal | 196.00 | 196.00 |
| Mill Addition | | |
| Spider Sulfur | 0.80 | → |
| Premix MBT | 0.94 | → |
| Premix TMTD | 0.63 | → |
| Premix DPTT | 0.63 | → |
| Premix TDEC | 0.63 | → |
| Total | 199.61 | 199.61 |

TABLE IV-continued

| Major Variable | RX-13804 | UBS 020602 |
|---|---|---|
| Processing Properties | | |
| Viscosity and Curing Properties | | |
| Mooney Viscosity at 135° C.(275° F.) | | |
| Minimum Viscosity | 30 | 29.6 |
| t5, minutes | 5.8 | 5.4 |
| t10, minutes | 7 | 6.7 |
| t35, minutes | 9.7 | 9.8 |
| Oscillating Disc Rheometer at 160° C.(320° F.) | | |
| $M_L$ | 5.6 | 5.9 |
| $M_H$ | 34.1 | 36.9 |
| $t_S2$, minutes | 2.2 | 2.2 |
| t'c(90), minutes | 4.8 | 6.5 |
| 1.25*t'c(90), minutes | 6 | 8.1 |
| Cure Rate Index | 37.6 | 23.1 |
| Vulcanizate Properties | | |
| Roll Spew | | |
| Temperature @ −40° C. | | |
| 24 hours | NONE | NONE |
| 48 hours | NONE | NONE |
| 72 hours | NONE | NONE |
| 96 hours | NONE | NONE |
| Temperature @ −3° C. | | |
| 24 hours | NONE | NONE |
| 48 hours | NONE | NONE |
| 72 hours | NONE | NONE |
| 96 hours | NONE | NONE |
| Temperature @ 25° C. | | |
| 24 hours | NONE | NONE |
| 48 hours | NONE | NONE |
| 72 hours | NONE | NONE |
| 96 hours | NONE | NONE |

| Example | 3 | 17 |
|---|---|---|
| Original Physical Properties | | |
| Stress @ 100% Elongation, MPa, | 1.5 | 2.1 |
| psi | 220 | 300 |
| Stress @ 200% Elongation, MPa | 2.9 | 4.3 |
| Stress @ 300% Elongation, MPa | 4.3 | 6.1 |
| Tensile Ultimate, MPa, | 14.3 | 13.3 |
| psi | 2080 | 1930 |
| Elongation @ Break, % | 805 | 590 |

TABLE IV-continued

| | | |
|---|---|---|
| Hardness Duro A, pts. | 57 | 60 |
| Specific Gravity | 1.067 | 1.068 |
| Compression Set, % 22 hrs. | 71 | 58 |
| Low Temperature Properties | | |
| Low Temperature Impact - Brittleness | | |
| Brittle Point, as molded, all pass, ° C. | >−75 | >−75 |
| After Air Oven Aging @ 150° C. | >−75 | >−75 |
| After Air Oven Aging @169° C. | −70 | −70 |
| Low Temperature Torsion - Gehman | | |
| As molded, Relative Modulus | | |
| T2, ° C. | −34 | −38 |
| T5, ° C. | −49 | −51 |
| T10, ° C. | −55 | −55 |
| T100, ° C. | −65 | −65 |
| Apparent Modulus of Rigidity Temperature at | 172 | 198 |
| 500 psi, ° C. | −41 | −41 |
| 5,000 psi, ° C. | −60 | −59 |
| 10,000 psi, ° C. | −63 | −62 |
| 25,000 psi, ° C. | −67 | −65 |
| 50,000 psi, ° C. | −72 | −75 |
| Aged Vulcanizate Properties | | |
| Air Oven Aging, 70 h @ 150° C. | | |
| Stress @ 100% Elongation, MPa, psi | 3.2<br>470 | 4.1<br>595 |
| Stress Change, % | 114 | 98 |
| Tensile Ultimate, MPa, psi | 10.8<br>1570 | 11.3<br>1640 |
| Tensile Change, % | −25 | −15 |
| Elongation @ Break, % | 280 | 220 |
| Elongation Change, % | −65 | −63 |
| Hardness Duro A, pts. | 67 | 67 |
| Hardness Change, pts. | 10 | 7 |
| Weight Change, % | −1.9 | −1.2 |
| Example | 3 | 17 |
| Air Oven Aging, 70 h @ 169° C. | | |
| Stress @ 100% Elongation, psi | 4.7<br>680 | 5.2<br>760 |
| Stress Change, % | 209 | 153 |
| Tensile Ultimate, MPa, psi | 6.6<br>955 | 8.4<br>1215 |
| Tensile Change, % | −54 | −37 |
| Elongation @ Break, % | 130 | 145 |
| Elongation Change, % | −84 | −75 |
| Hardness Duro A, pts. | 71 | 70 |
| Hardness Change, pts. | 14 | 10 |
| Weight Change, % | −3.0 | −1.6 |

In the following examples provided in Table V, cyclic dimerate esters were applied to Natural Rubber (SMR CV 60). The dimerate esters were evaluated at 15 phr and compared to a conventional napthenic oil at 30 phr (i.e., the conventional rubber plasticizer was added to the elastomer composition at twice the amount of the rubber plasticizers disclosed herein).

Results

The processing and curing properties show no major differences except that since the dimerates are evaluated at lower phr they do produce higher viscosity compounds. Compatibility data (i.e., lack of roll spew) show that the dimerate ester evaluated in Table V is compatible with natural rubber. The dimerate esters provide higher tensile strength and hardness values than other plasticizers.

Table V shows the low temperature properties for elastomers plasticized with various compounds. The low temperature properties of the compositions plasticized with dimerate esters are highly significant in comparison to elastomers plasticized with paraffinic oil. For example, even though the dimerates are at 15 phr and naphthenic is at 30 phr, the dimerates provide substantially equal low temperature properties. The combination of high strength and hardness with excellent low temperature properties are important for applications such as hoses, automotive isolators, seals and gaskets.

Additionally, the dimerate esters are significantly lower in volatility when compared to napthenic oil.

TABLE V

| Example | 18 | 19 | 20 | 21 | 22 |
|---|---|---|---|---|---|
| SMR CV 60 | 100.00 | → | → | → | → |
| Kadox 930 | 5.00 | → | → | → | → |
| Stearic Acid | 2.00 | → | → | → | → |
| N 330 | 35.00 | → | → | → | → |
| Process Oil C-255-E | 30.00 | — | — | — | — |
| RX-13804 | — | 15.00 | — | — | — |
| RX-13824 | — | — | 15.00 | — | — |
| RX-13805 | — | — | — | 15.00 | — |
| RX-13896 | — | — | — | — | 15.00 |
| Mill Addition | | | | | |
| Sulfur | 2.25 | → | → | → | → |
| Santocure TBBS | 0.70 | → | → | → | → |
| Total | 174.95 | 159.95 | 159.95 | 159.95 | 159.95 |

TABLE V-continued

| Major Variable | Process Oil C-255-E | RX-13804 | RX-13824 | RX-13805 | RX 13896 |
|---|---|---|---|---|---|
| Processing Properties | | | | | |
| Viscosity and Curing Properties | | | | | |
| Mooney Viscosity at 168° C.(335° F.) | | | | | |
| Minimum Viscosity | 32.9 | 34.1 | 30.9 | 31.5 | 28.6 |
| t5, minutes | 3.4 | 1.8 | 2.4 | 2.2 | 2.6 |
| t10, minutes | 3.8 | 2.6 | 3 | 2.9 | 3 |
| t35, minutes | 4.3 | 3.5 | 3.8 | 3.6 | 3.6 |
| Oscillating Disc Rheometer at 168° C.(335° F.) | | | | | |
| $M_L$ | 4.3 | 6.1 | 5.8 | 6.7 | 6.7 |
| $M_H$ | 4.5 | 6.1 | 5.8 | 6.7 | 6.7 |
| $t_s2$, minutes | 2.5 | 2 | 2.3 | 2.2 | 2.2 |
| t'c(90), minutes | 3.6 | 3.1 | 3.4 | 3.3 | 3.4 |
| 1.25*t'c(90), minutes | 4.5 | 3.9 | 4.3 | 4.1 | 4.3 |
| Cure Rate Index | 92.6 | 92.6 | 91.7 | 92.6 | 80 |
| Example | 18 | 19 | 20 | 21 | 22 |
| Original Physical Properties | | | | | |
| Stress @ 100% Elongation, MPa, | 0.8 | 1.1 | 1.2 | 1.1 | 1.2 |
| psi | 115 | 160 | 170 | 160 | 170 |
| Stress @ 200% Elongation, MPa | 1.6 | 2.4 | 2.6 | 2.4 | 2.6 |
| Stress @ 300% Elongation, MPa | 3.1 | 4.7 | 5 | 4.7 | 5 |
| Tensile Ultimate, MPa, | 16.3 | 23.6 | 24.2 | 23.0 | 22.5 |
| psi | 2365 | 3420 | 3505 | 3330 | 3260 |
| Elongation @ Break, % | 695 | 700 | 705 | 700 | 670 |
| Hardness Duro A, pts. | 40 | 46 | 47 | 46 | 47 |
| Specific Gravity | 1.049 | 1.065 | 1.067 | 1.068 | 1.069 |
| Low Temperature Properties | | | | | |
| Low Temperature Impact - Brittleness | | | | | |
| Brittle Point, as molded, all pass, ° C. | −55 | −60 | −55 | −55 | −55 |
| Low Temperature Torsion - Gehman | | | | | |
| As molded, Relative Modulus | | | | | |
| T2, ° C. | −42 | −47 | −49 | −48 | −49 |
| T5, ° C. | −54 | −57 | −57 | −57 | −58 |
| T10, ° C. | −58 | −59 | −59 | −59 | −60 |
| T100, ° C. | −64 | −65 | −65 | −65 | −65 |
| Apparent Modulus of Rigidity Temperature at | 65 | 103 | 118 | 118 | 102 |
| 500 psi, ° C. | −57 | −56 | −56 | −56 | −57 |
| 5,000 psi, ° C. | −64 | −64 | −63 | −63 | −64 |
| 10,000 psi, ° C. | −65 | −65 | −64 | −64 | −65 |
| 25,000 psi, ° C. | −67 | −68 | −65 | −65 | −68 |
| 50,000 psi, ° C. | −69 | −69 | −69 | −69 | −69 |
| Air Oven Aging, 70 h @ 100° C. | | | | | |
| Stress @ 100% Elongation, MPa, | 1.1 | 1.1 | 1.1 | 1.1 | 1.1 |
| psi | 165 | 160 | 165 | 160 | 160 |
| Stress Change, % | 43 | 0 | −2.9 | 0.0 | −5.9 |
| Tensile Ultimate, MPa, | 4.4 | 4.3 | 3.6 | 3.9 | 3.1 |
| psi | 635 | 630 | 520 | 570 | 450 |
| Tensile Change, % | −73 | −82 | −85 | −83 | −86 |
| Elongation @ Break, % | 290 | 270 | 240 | 260 | 220 |
| Elongation Change, % | −58 | −61 | −66 | −63 | −67 |
| Hardness Duro A, pts | 46 | 40 | 41 | 39 | 39 |
| Hardness Change, pts. | 6 | −6 | −6 | −7 | −8 |
| Weight Change, % | −13 | −0.90 | −0.47 | −0.48 | −0.43 |

In the following examples provided in Table VI, cyclic dimerate esters were applied to Polychloroprene (Neoprene WRT). Again, the dimerate esters were evaluated at 15 phr and compared to a conventional napthenic oil at 30 phr (i.e., the conventional rubber plasticizer was added to the elastomer composition at twice the amount of the rubber plasticizers disclosed herein).

Results

The processing and curing properties show no major differences except that since the dimerates are evaluated at lower phr they do produce higher viscosity compounds. Compatibility data show that the dimerate ester evaluated in Table VI is compatible, as indicated by the lack of roll spew and low weight loss in air oven aging. The dimerate ester provides higher tensile strength and hardness values than other plasticizers.

Table VI shows the low temperature properties for elastomers plasticized with various compounds. The low temperature properties of the composition plasticized with the dimerate ester are highly significant in comparison to elastomers plasticized with paraffinic oil. For example, even though the dimerate is at 15 phr and the processing oil at 30 phr, the dimerate provides equal low temperature properties. The combination of high strength and hardness with excellent low temperature can have importance in applications such as V-belts, radiator hoses, automotive insulation, seals and gaskets.

Additionally, the dimerate ester is significantly lower in volatility when compared to the napthenic oil (air oven aging).

TABLE VI

| Example | 23 | 24 |
|---|---|---|
| Neoprene WRT | 100.00 | → |
| Stearic Acid | 2.00 | → |
| Octamine | 1.00 | → |
| Mag Ox TN16 | 2.20 | → |
| N 774 | 70.00 | → |
| Premix TMTD | 0.30 | → |
| Process Oil C-255-E | 30.00 | — |
| RX-13804 | — | 15.00 |
| Subtotal | 205.50 | 190.50 |
| Mill Addition | | |
| PB(ETU)75 | 0.80 | → |
| Kadox 930 | 5.00 | → |
| Total | 211.30 | 196.30 |
| Processing Properties | | |
| Viscosity and Curing Properties | | |
| Mooney Viscosity at 135° C.(275° F.) | | |
| Minimum Viscosity | 16.6 | 36.2 |
| t5, minutes | 9.5 | 7.3 |
| t10, minutes | 10.8 | 8.2 |
| t35, minutes | 13.8 | 10.3 |
| Oscillating Disc Rheometer at 160° C.(320° F.) | | |
| $M_L$ | 3.1 | 8 |
| $M_H$ | 19.1 | 50.7 |
| $t_S2$, minutes | 3.6 | 2.5 |
| t'c(90), minutes | 14.8 | 17.3 |
| 1.25*t'c(90), minutes | 18.5 | 21.7 |
| Cure Rate Index | 8.9 | 6.7 |
| Example | 23 | 24 |
| Original Physical Properties | | |
| Stress @ 100% Elongation, MPa | 2.5 | 4.8 |
| psi | 360 | 690 |
| Stress @ 200% Elongation, MPa | 6.5 | 13.5 |
| Stress @ 300% Elongation, MPa | 12.3 | — |
| Tensile Ultimate, MPa, | 13.2 | 15.8 |

TABLE VI-continued

| | | |
|---|---|---|
| psi | 1920 | 2295 |
| Elongation @ Break, % | 320 | 225 |
| Hardness Duro A, pts. | 56 | 69 |
| Specific Gravity | 1.342 | 1.394 |
| Low Temperature Properties | | |
| Low Temperature Impact - Brittleness | | |
| Brittle Point, as molded, all pass, ° C. | −41 | −40 |
| Low Temperature Torsion - Gehman As molded, Relative Modulus | | |
| T2, ° C. | −28 | −22 |
| T5, ° C. | −37 | −34 |
| T10, ° C. | −40 | −39 |
| T100, ° C. | −46 | −45 |
| Apparent Modulus of Rigidity Temperature at | 144 | 232 |
| 500 psi, ° C. | −40 | −24 |
| 5,000 psi, ° C. | −44 | −41 |
| 10,000 psi, ° C. | −45 | −44 |
| 25,000 psi, ° C. | −48 | −45 |
| 50,000 psi, ° C. | −50 | −49 |
| Air Oven Aging, 70 h @ 125° C. | | |
| Stress @ 100% Elongation, MPa, | 9.9 | 6.7 |
| psi | 1430 | 970 |
| Stress Change, % | 297 | 41 |
| Tensile Ultimate, MPa | 14.9 | 16.4 |
| psi | 2160 | 2375 |
| Tensile Change, % | 13 | 3 |
| Elongation @Break, % | 165 | 205 |
| Elongation Change, % | −48 | −9 |
| Hardness Duro A, pts | 86 | 75 |
| Hardness Change, pts. | 30 | 6 |
| Weight Change, % | −13 | −0.48 |

TABLE VII

Materials List for Tables I–VI

| Material | Chemical Description | Supplier |
|---|---|---|
| Royalene 501 | Ethylene-propylene ethylidene norbornene rubber 57/43 EP Ratio | Uniroyal |
| Royalene 502 | ENB third monomer 62/38 EP ratio | Uniroyal |
| N-550 | Carbon Black | Engineering Carbon |
| Kadox 930 | Zinc Oxide | The C. P. Hall Company |
| Stearic Acid | Stearic Acid, Rubber Grade | The C. P. Hall Company |
| RX-13577 | Tridecyl tallate | The C. P. Hall Company |
| RX-13782 | Capryl Tallate | The C. P. Hall Company |
| RX-13804 | Di(2-ethylhexyl)dimerate (Empol 1016) | The C. P. Hall Company |
| RX-13805 | Di(2-ethylhexyl)dimerate (Empol 1018) | The C. P. Hall Company |
| RX-13806 | Didecyl dimerate | The C. P. Hall Company |
| RX-13824 | Di-tridecyl dimerate | The C. P. Hall Company |
| RX-13853 | Di-hexyldecyl tallate | The C. P. Hall Company |
| RX-13896 | Di(2-ethylhexyl)dimerate (Unidyme 22) | The C. P. Hall Company |
| SMR CV 60 | Natural Rubber | The C. P. Hall Company |
| N-330 | Carbon Black | Degussa |
| Process Oil C-255-E | Parraffinic Oil | The C. P. Hall Company |
| Sulfur | Sulfur | The C. P. Hall Company |
| Santocure TBBS | N-t-butyl-2-benzothiazolesulfenamide | Harwick Standard |
| UBS 020602 | Di(2-ethylhexyl)dimerate (Pripol 1006) | The C. P. Hall Company |
| Plasthall DOS | Dioctyl Sebacate | The C. P. Hall Company |
| Sunpar 2280 | Parraffinic Oil | Sun Refining |
| Spider Sulfur | Elemental Sulfur | The C. P. Hall Company |
| Premix MBT | 2-mercaptobenzothiazole | The C. P. Hall Company |

TABLE VII-continued

Materials List for Tables I–VI

| Material | Chemical Description | Supplier |
| --- | --- | --- |
| Premix TMTD | Tetramethyl thiuram disulfide | The C. P. Hall Company |
| Premix DPTT | Dipentamethylene thiuram(tetra)sulfide | The C. P. Hall Company |
| Premix TDEC | Tellurium diethyldithiocarbamate | The C. P. Hall Company |
| Neoprene WRT | Polychloroprene | R. T. Vanderbilt |
| Octamine | Octylated diphenylamine | Uniroyal |
| Mag Oxide TN16 | Magnesium Oxide | The C. P. Hall Company |
| N-774 | Carbon Black | Degussa |
| PB(ETU)75 | Ethylene Thiourea 75% | Rhein Chemie |

What is claimed is:

1. A plasticized elastomer composition comprising rubber selected from the group consisting of natural rubber, synthetic rubber, and a combination thereof, and a cyclic dimerate or trimerate ester plasticizer compound having formula I, II, or a mixture thereof:

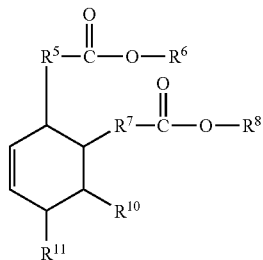

(I)

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are a $C_3$–$C_{24}$ alkyl radical, straight chain or branched, saturated, or unsaturated containing 1 to 3 carbon-to-carbon double bonds; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

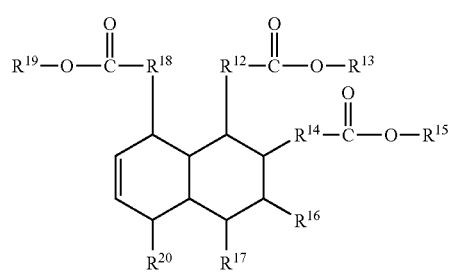

(II)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ alkyl radical, straight chain or branched, saturated, or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

2. A composition in accordance with claim 1, wherein the plasticizer is selected from the group consisting of formula I, II, and a combination thereof:

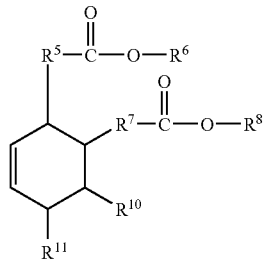

(I)

wherein $R^5$ and $R^7$, are a $C_6$–$C_{24}$ hydrocarbon chain, straight chain or branched; either saturated or having 1 to 3 carbon-to-carbon double bonds;

$R^6$ and $R^8$, same or different, are a $C_3$–$C_{18}$ alkyl radical, straight chain or branched, saturated, or unsaturated containing 1 to 3 carbon-to-carbon double bonds, and $R^{10}$ and $R^{11}$, same or different, are $C_3$–$C_{18}$ saturated hydrocarbon chain, straight chain or branched; or an unsaturated hydrocarbon chain, straight chain or branched, containing 1 to 3 carbon-to-carbon double bonds;

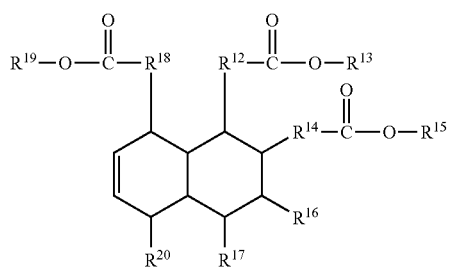

(II)

wherein $R^{12}$, $R^{14}$ and $R^{18}$, same or different, are a $C_6$–$C_{24}$ hydrocarbon chain, straight chain or branched, either saturated or containing 1 to 3 carbon-to-carbon double bonds;

$R^{13}$, $R^{15}$ and $R^{19}$, same or different, are a $C_3$–$C_{18}$ alkyl radical, straight chain or branched, saturated, or unsaturated containing 1 to 3 carbon-to-carbon double bonds; and $R^{16}$, $R^{17}$ and $R^{20}$, same or different, are a $C_3$–$C_{18}$ saturated hydrocarbon chain, straight chain or branched; or an unsaturated $C_3$–$C_{18}$ hydrocarbon-chain, straight chain or branched, containing 1 to 3 carbon-to-carbon double bonds.

3. A composition in accordance with claim 1, wherein the plasticizer compound having formula I, II, or a mixture thereof is present in an amount from about 0.1 parts to about 50 parts by weight per 100 parts of rubber.

4. A composition in accordance with claim 1, wherein the plasticizer compound having formula I, II, or a mixture thereof is present in an amount from about 2 parts to about 40 parts by weight per 100 parts of rubber.

5. A composition in accordance with claim 1, wherein the plasticizer compound having formula I, II, or a mixture thereof is present in an amount from about 10 parts to about 35 parts per 100 parts of rubber.

6. A composition in accordance with claim 1, wherein the plasticizer is an unsaturated diester formed by the reaction of a $C_{36}$ dimer acid and a $C_3$–$C_{18}$ alcohol, straight chain or branched, saturated, or unsaturated containing 1 to 3 carbon-to-carbon double bonds.

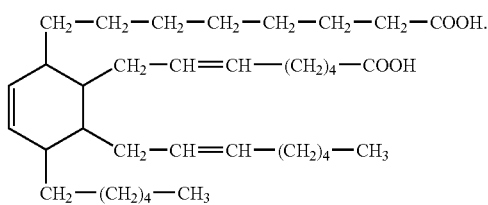

14. A composition in accordance with claim 1, wherein the plasticizer is the reaction product of a $C_3$–$C_{24}$ alcohol with a tricarboxylic acid, having the following formula:

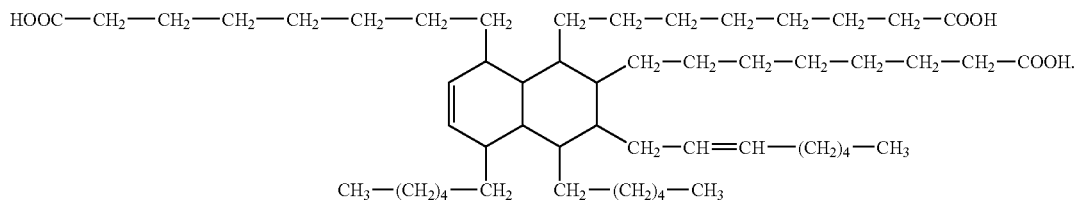

7. A composition in accordance with claim 6, wherein the alcohol is 2-ethylhexyl alcohol.

8. A composition in accordance with claim 6, wherein the alcohol is tridecyl alcohol.

9. A composition in accordance with claim 6, wherein the alcohol is oleyl alcohol.

10. A composition in accordance with claim 6, wherein the alcohol is n-butyl alcohol.

11. A composition in accordance with claim 1, wherein the plasticizer comprises the following dimer acid reacted with a $C_3$–$C_{24}$ alcohol:

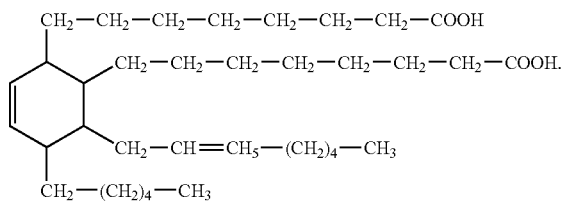

12. A composition in accordance with claim 1, wherein the plasticizer comprises the following dimer acid reacted with a $C_3$–$C_{24}$ alcohol:

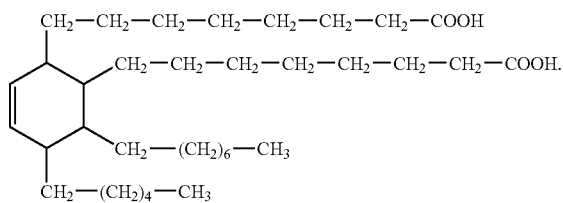

13. A composition in accordance with claim 1, wherein the plasticizer comprises the following dimer acid reacted with a $C_3$–$C_{24}$ alcohol:

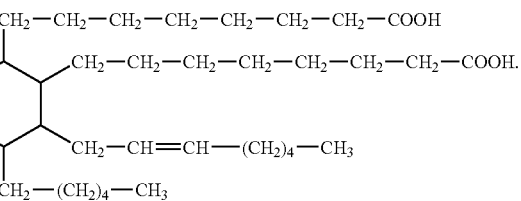

15. A composition in accordance with claim 1, wherein the plasticizer is a combination of compounds represented by formula I and II.

16. A composition in accordance with claim 15, wherein the plasticizer is a reaction product of a $C_3$–$C_{24}$ alcohol straight chain or branched, saturated, or unsaturated having 1 to 3 carbon-to-carbon double bonds, with a dimer acid having CAS #61788-89-4.

17. A composition in accordance with claim 16, wherein the alcohol is 2-ethylhexyl alcohol.

18. A composition in accordance with claim 16, wherein the alcohol is tridecyl alcohol.

19. A rubber composition in accordance with claim 16, wherein the alcohol is oleyl alcohol.

20. A composition in accordance with claim 16, wherein the alcohol is n-butyl alcohol.

21. The composition in accordance with claim 1, wherein $R^5$, $R^7$, $R^{12}$, $R^{14}$ are fatty acid residues derived from animal or vegetable fatty acids.

22. The composition of claim 21, wherein the fatty acids are selected from the group consisting of butter; lard; tallow; grease; herring; menhaden; pilchard; sardine; babassu; castor; coconut; corn; cottonseed; jojoba; linseed; oiticia; olive; palm; palm kernel; peanut; rapeseed; safflower; soya; sunflower; tall; tung; and mixtures thereof.

23. The composition of claim 21, wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9-octadecenoic, 12-hydroxy; 9,12-octadecadienoic; 9,12,15-octadecatrienoic; 9,11,13-octadecatrienoic; 9,11,13-octadecatrienoic; 4-oxo; octadecatetrenoic; eicosanoic; 11-eicosenoic; eicosadienoic; eicosatrienoic; 5,8,11,14-eicosatetraenoic; eicosapentaenoic; docosanoic; 13-docosenoic; docosatetraenoic; 4,8,12,15,19-docosapentaenoic; docosahexaenoic; tetracosenoic; and 4,8,12,15,18,21-tetracosahexaenoic.

24. A method of plasticizing an elastomeric composition, said elastomeric composition including one or more natural or synthetic rubbers, and a rubber vulcanizing agent, comprising adding to said rubber composition, in an amount of about 0.1 parts to about 50 parts by weight per 100 parts of rubber in the composition, a cyclic ester plasticizer of formula I, II, or mixtures thereof:

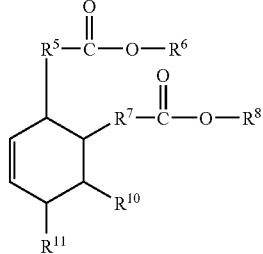

(I)

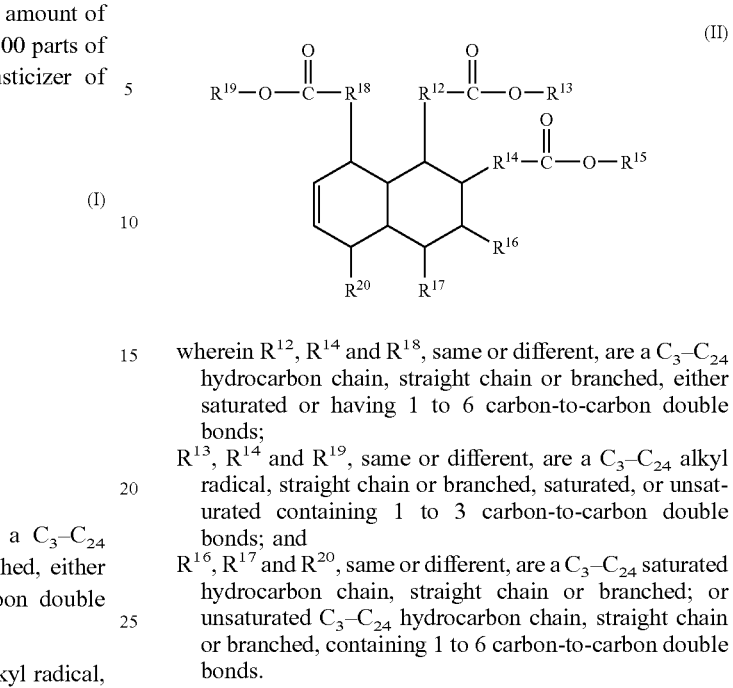

(II)

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are a $C_3$–$C_{24}$ alkyl radical, straight chain or branched; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{14}$ and $R^{19}$, same or different, are a $C_3$–$C_{24}$ alkyl radical, straight chain or branched, saturated, or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

25. The method of claim 24, wherein the cyclic ester plasticizer is added in an amount from about 2 parts to about 40 parts by weight per 100 parts of rubber.

26. The method of claim 24, wherein the cyclic ester plasticizer is added in an amount from about 10 parts to about 35 parts per 100 parts of rubber.

* * * * *